July 3, 1951 G. H. FRITZINGER 2,558,945
ELECTRICAL INDICATING SYSTEM
Filed June 20, 1947 3 Sheets-Sheet 1

INVENTOR
George H. Fritzinger
BY Henry Lanahan
ATTORNEY

July 3, 1951          G. H. FRITZINGER          2,558,945
ELECTRICAL INDICATING SYSTEM
Filed June 20, 1947          3 Sheets-Sheet 2
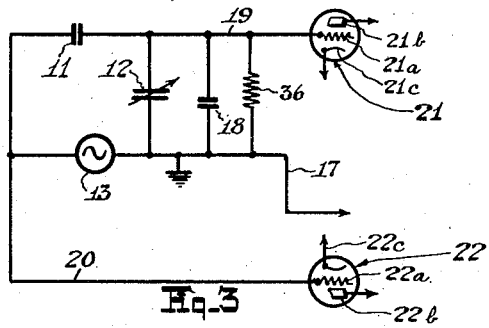
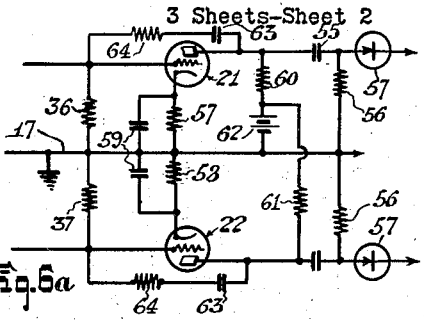
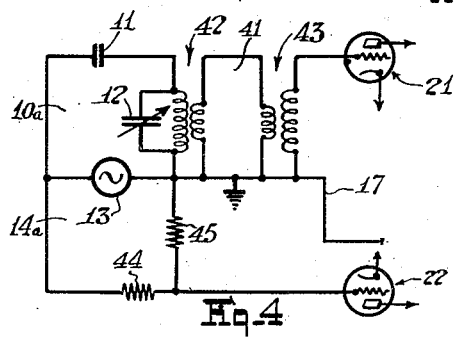
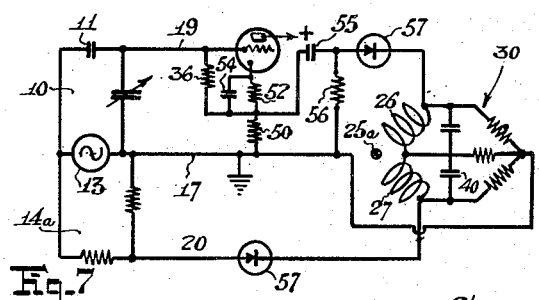
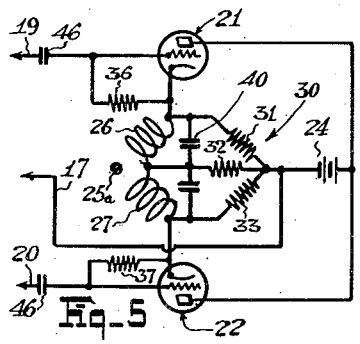
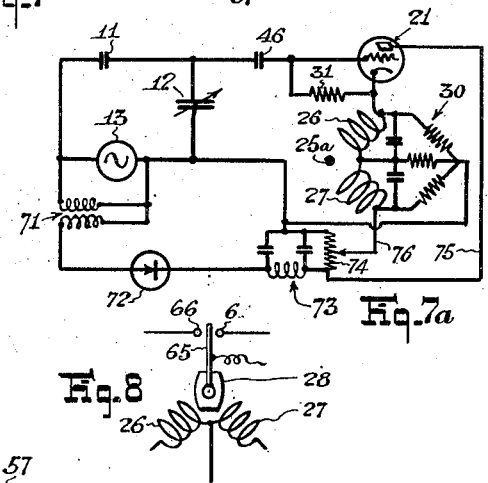
INVENTOR
George H. Fritzinger
BY Henry Lanahan
ATTORNEY July 3, 1951 G. H. FRITZINGER 2,558,945
ELECTRICAL INDICATING SYSTEM
Filed June 20, 1947 3 Sheets-Sheet 3

INVENTOR
George H. Fritzinger
BY Henry Lanahan
ATTORNEY

Patented July 3, 1951

2,558,945

UNITED STATES PATENT OFFICE 2,558,945

ELECTRICAL INDICATING SYSTEM

George H. Fritzinger, West Orange, N. J., assignor to Thomas A. Edison, Incorporated, West Orange, N. J., a corporation of New Jersey Application June 20, 1947, Serial No. 755,869

14 Claims. (Cl. 177—351)

This invention relates to electrical systems for indicating, measuring, or controlling (the term "measuring" being hereinafter considered as being included within the meaning of the term "indicating") according to variations in an electrical quantity (voltage, current, frequency, etc.), an impedance (capacity, inductance or resistance), or conditions representable in terms of such electrical quantity or impedance.

This invention has particular utility in connection with liquid-level measuring and control systems, and is herein illustrated and particularly described in connection with such systems, but the present invention has a wide range of applications and no unnecessary limitation to the particular application herein described is intended.

It is well known to vary a capacitance or resistance according to variations in the level or quantity of a liquid, and to then measure that capacitance or resistance directly in terms of liquid level or quantity. Particularly, it is common to effect a capacitance variation with change in level or quantity of electrically non-conductive liquids, such as gasoline, by placing a group of two or more vertically-extending condenser plates in the tank containing the gasoline. These plates have open spaces therebetween so that below the level of measurement the dielectric medium between the plates is gasoline and above that level the dielectric medium is air. Since gasoline has a dielectric constant equal approximately to twice that of air, changes in the level of the gasoline cause proportional changes in the capacity of the condenser plates. Typically, in present aircraft applications, this capacitance varies from 400 to 800 mmfd. as from empty to full tank conditions.

This invention is particularly adapted to fulfill the needs for a stable and reliable electrical system for aircraft, for measuring such electrical capacity in terms of liquid level or quantity and for effecting control actions in response to variations of such electrical capacity. The invention is however not peculiar to the measurement of electrical capacity, but is applicable as well, as will be hereinafter apparent, to the measurement of the other electrical quantities and impedances abovementioned.

Broadly, the present system is of a type known in the art wherein two A.-C. voltages are obtained from a common source, one of which is dependent on a quantity under measurement, and are compared to produce a deflection of a movable element according to their ratio. Preferably, although not necessarily, the invention contemplates rectifying the two A.-C. voltages and comparing them by a D.-C. type of instrument—which is itself also known in the art. Certain novel and important features and objects of the present invention are:

(1) To provide an improved measuring and/or control system of the type mentioned which is inherently independent of the frequency of the driving source, and which is adapted to work efficiently at any frequency of that source within a range of the order of a few cycles per second to hundreds of kilocycles per second;

(2) To provide such system which is substantially independent of the magnitude of the driving source;

(3) To provide an efficient such system which does not draw any power from the driving source or affect the magnitude or character of the voltages under comparison;

(4) To provide such a system in which undesired variables such as temperature-induced effects are substantially balanced out;

(5) To provide such system in which at least the variable voltage under measurement is transmitted to a measuring or control circuit by a thermionic stage including grid, cathode and plate elements connected to operate with feedback either in cathode-follower arrangement or with plate-to-grid coupling;

(6) To provide such system wherein both voltages under comparison are fed to measuring or control devices by thermionic stages connected to operate with feedback so that the operation of the stages is substantially independent of the plate voltages and tube characteristics;

(7) To provide such system wherein the voltages under comparison are fed to low-impedance measuring or control circuits and are rectified by thermionic stages of the cathode-follower type; and (8) To provide such system wherein cathode-follower stages are arranged so that the final indications or control actions are independent of any steady component of plate current.

Furthermore, it is an object to provide a cathode-follower stage which is biased to operate as a rectifier without influence from D.-C. plate current.

Still further, it is an object to provide electrical measuring and/or control systems of the character mentioned which are simple, straightforward, readily amenable to analysis, easy to adjust and calibrate, dependable, and economical to manufacture.

These and other object and features of my invention will be apparent from the following description and the appended claims.

In the description of my invention reference is had to the accompanying drawings, of which:

Figures 3 and 4 are fractional schematic views illustrating modified input circuits intended for optional substitution for the lefthand portion of the liquid-level system shown in Figure 1;

Figure 5 is a fractional schematic view illustrating a modified cathode follower circuit intended for optional substitution in Figure 1;

Figure 6 is a schematic view illustrating an indicating and/or control system according to my invention wherein the cathode-follower circuits are adapted to pass A.-C. voltages and the rectification is effected by separate devices;

Figure 6a is a modified substantially equivalent form of the system of Figure 6;

Figures 7 and 7a show modified forms of the systems of Figures 6 and 5 respectively wherein only a single amplifier stage is employed;

Figure 8 is a fractional view of a ratio-type instrument adapted for control purposes and usable in place of the indicating instruments illustrated in the foregoing figures;

Figure 9 is a fractional schematic view illustrating an input circuit for my invention for measuring frequency;

In the present electrical systems there are two alternating-current circuits fed from a common source, at least one of which is a variable voltage-divider circuit comprising a fixed impedance element and a variable impedance element in series. In liquid-level measuring systems, and other like applications wherein it is desired that the final indications be independent of the frequency of that source, both impedance elements of that circuit are of the same type—i. e., capacitive, inductive or resistive. The other circuit may not include any impedance elements at all if the whole voltage of the driving source may be taken as a reference voltage. However, if any fraction of the voltage of the driving source is to be used as the reference voltage, the second circuit will include two fixed impedance elements in series to form a fixed voltage-divider circuit. In the particular application herein illustrated the elements of this circuit are also preferably of the same type so that this circuit will not be sensitive to frequency of the source, but these elements need not be of the same type as are those of the variable divider circuit as will hereinafter appear.

Figure 1:
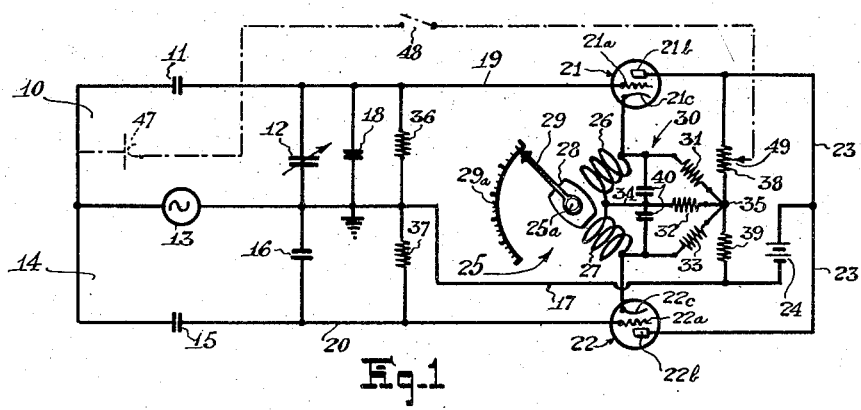
Figure 1 is a schematic view of a preferred form of electrical indicating system according to my invention, illustrated for indicating according to variations in an electrical capacity such for example as is used for measurement of gasoline or other liquids.

In the embodiment shown in Figure 1 the variable voltage-divider circuit, referred to as 10, comprises a fixed condenser 11 and a variable condenser 12 connected in series across a source 13 of alternating current. The fixed voltage-divider circuit, referred to as 14, comprises fixed condensers 15 and 16 connected in series also across the source 13. One side of the source 13 is preferably connected to ground, as at 17, and the voltages to be compared are typically taken from the impedance elements of the respective divider circuits which are connected directly to ground. Thus, the voltages are taken from the variable condenser 12 and the fixed condenser 16. It is to be noted however that in the variable divider circuit, the voltage need not be taken from the variable one of the two impedance elements since the voltage across the fixed element varies to the same extent, but in reverse direction, as does the voltage across the variable element. When the variable condenser is of the type adapted to be immersed in a liquid to have a variable capacity proportional to the level or quantity of that liquid, it is desirable that one side of this condenser be connected to ground so as to lessen the possibility of shorts developing across the condenser; in liquid-level measuring systems, therefore, the variable condenser 12 is preferably connected to the ground line 17 and the variable voltage is taken directly from that condenser.

In the foregoing description, it will be understood that the term "variable" as applied to one of the two voltages under comparison refers to variations in that voltage in response to variations in the quantity under measurement. It will be understood that this voltage may also vary from other influences as in response to variations in the magnitude of the voltage of the source 13 but that such other variations are balanced out and are ineffective to influence the final indications, or control action, as the case may be.

Since the tank condenser 12 has typically in aircraft applications a low capacity of the order of 400 to 800 mmfd., and since the lead connections to this condenser may be quite long and may therefore have a stray capacity of a comparable order of magnitude, this stray capacity is represented by the fixed condenser 18 connected in shunt with the variable condenser 12.

In order to obtain a maximum percentage variation of the voltage from the variable condenser 12, the capacity of the fixed condenser 11 should be small—i. e., have a high impedance—relative to that of the variable condenser. However, when the capacity of the fixed condenser is small relative to that of the variable condenser, the variable condenser captures only a small percentage of the voltage of the driving source. Therefore, as the capacity of the fixed condenser is reduced, a driving source of greater voltage is required in order to maintain the mean varying voltage at a given value. For best conditions of balance it may be desired that the fixed condenser 11 have a capacity equal to the mean value of the condensers 12 and 18. While a wide latitude in choice of the capacities of the condensers 15 and 16 is permitted, for best conditions of balance it may be desirable that the capacities of these condensers be the same as that of the condenser 11.

The voltages under comparison are fed by leads 19 and 20 to grids 21a and 22a of respective electron discharge devices 21 and 22. Each of these devices has also a plate and cathode designated by the number of the device with the suffix letters b and c respectively. These devices may, for example, be the triode sections of a 6SN7 tube. The plates of these devices are connected by a lead 23 directly to a source of potential which may be a battery 24. The loads for these devices are connected in the cathode circuits, and therefore the devices are referred to as being connected as cathode followers.

The load may comprise a ratio-type instrument or any suitably compensated instrument adapted to produce deflections of a movable element substantially according to the ratio of two currents. In any case such instrument will have two coils differently energizable to produce the deflections. Of the strictly ratio-type instruments, there may for example be used the ratiometer described in Kelly Patent No. 2,362,562, issued November 14, 1944. An instrument 25 of this type is diagrammatically shown in Figure 1 as comprising two field coils 26 and 27 positioned at angles to each other about a central axis 25a, a permanent magnet 28 pivoted at the axis 25a, a pointer 29 carried with the permanent magnet and a suitably-calibrated scale 29a (fractionally shown) with which the pointer registers. The operation of this instrument is such that when only one of the two coils is energized the magnet aligns itself with that coil, and when both coils are energized the magnet takes an intermediate position between the coils in proportion to the relative energizations of the coils.

The coils of the instrument 25 are connected in a bridge-type circuit 30 which is adapted to cause the current in one coil to decrease to a minimum as the current in the other coil is increased to a maximum, and vice versa. Such a bridge-type circuit is formed in the present instance by connecting the two coils in series between the cathodes 21c and 22c, and by connecting resistors 31, 32 and 33 from the cathodes and from the junction 34 between the coils to a common junction 35. This bridge network of coils and resistors forms the principal load for each electron device 21 and 22, this load being that which appears effectively between the respective cathodes and the junction 35.

Preferably, the electron discharge devices 21 and 22 are biased so that they will also rectify the two voltages under comparison, the term "bias" being herein employed to embrace "zero" bias as well as any finite bias. In the system shown in Figure 1 the grids are biased to plate current cutoff by returning the grids through grid leak resistors 36 and 37 to ground and by holding the cathode above ground potential by connecting the junction 35 to a bleeder circuit comprising resistors 38 and 39 connected in series across the plate supply battery 24. Since the bias so produced has always a fixed relation to the plate voltage, plate current cutoff is maintained irrespective of variations in the plate voltage.

The grid leak resistors have high resistances relative to the impedances across which the voltages under comparison are derived. Since the grid-cathode circuits of the electron discharge devices present no load on the voltages under comparison—in that the grids are always negative relative to the cathodes, as will hereinafter appear—it is evident that the measuring or controlling apparatus herein provided presents substantially no load on the voltage or element under measurement to influence or affect that voltage or element.

The operation of a cathode-follower stage is expressed very simply by the formula $$i = \frac{\left(\frac{mu}{mu+1}\right)e}{R_1 + \frac{R_p}{mu+1}}$$

where $i$ is the discharge or cathode current, $mu$ is the amplification factor of the tube, $e$ is the dynamic voltage impressed on the grid, $R_p$ is the dynamic plate resistance of the tube, and $R_1$ is the dynamic load impedance. By analogy to the conventional amplifying stage, the propagation factor of a cathode-follower stage is always somewhat less than 1, being $mu/(mu+1)$; but the effective dynamic plate resistance of the tube is very low, being $R_p/(mu+1)$, which is only approximately 650 ohms for one section of a 6SN7 tube above referred to. Thus, the cathode follower is essentially an impedance-transforming device which produces very little loss in voltage. Because of this characteristic of the cathode-follower stage, it is admirably suited to the application of liquid-level measurement because of the typically high impedance of the immersed detecting condenser and the relatively low impedance of the usual measuring instrument. Since the cathode follower is a voltage-degenerative one it is characterized, so long as the load resistance is high relative to the effective dynamic plate resistance of the tube, by high stability in response to variations in the plate supply voltage and of the tube characteristics. However, notwithstanding that the cathode follower is a degenerative one on a voltage basis, it has a high power amplification factor when the stage is fed from a high-impedance source. This is because the cathode-follower stage has a relatively low dynamic plate resistance.

Figure 2:
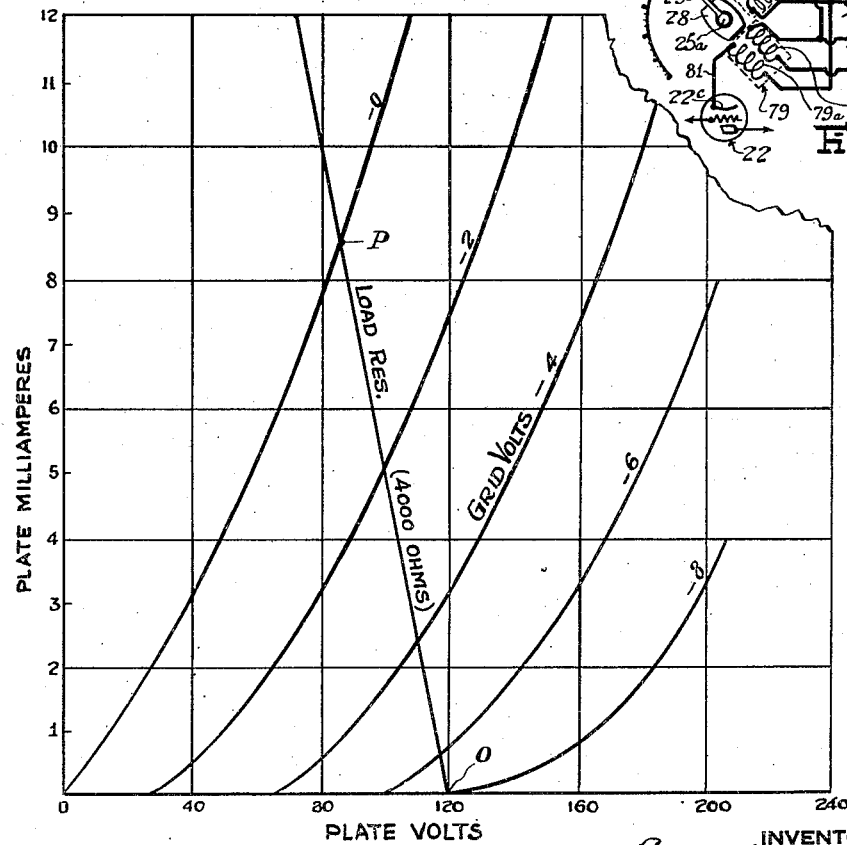
Figure 2 shows a typical plate-current plate-voltage family of curves for a triode, together with a load line, to illustrate better the operation of the cathode-follower stages included in the system of Figure 1.

By reference to the graph of Figure 2 there may be readily visualized the operation of each cathode-follower stage when the tube is biased to plate current cutoff. This graph shows a family of the plate-current plate-voltage curves for a 6J5 tube—the equivalent of one section of a 6SN7 tube—and includes a load line for 4000 ohms drawn from a point 0 at 120 v. and 8 v. grid bias on the plate voltage axis, this load of 4000 ohms being a typical one for each cathode-follower stage as is hereinafter apparent. During each negative half cycle of the A.-C. voltage applied to the grid of each cathode-follower stage, the grid is swung ever more negative and no plate current flows. During each positive half cycle, there is an excursion up the load line but to an extent which is only a fraction of the voltage applied to the grid because of the grid-following action of the cathode. [For example, an excursion up the load line to zero grid bias will cause a peak plate current of 8.5 ma., and cause the cathode potential to rise by 34 v. (.0085×4000). To produce this zero grid bias the voltage on the grid must be raised by the 34 v. of the cathode plus the initial 8 v. bias, or by a total of 42 v.] These alternate half-cycle excursions up the load line cause pulses of D.-C. current to flow from each cathode through the bridge network to the junction 35 and thence through the resistor 39 of the bleeder circuit to ground. The average value of this current from the cathode 22c is fixed as for any given value of the A.-C. source 13, but the average value of the current from the cathode 21c varies as the condenser 12 varies. Upon properly adjusting the bridge resistors 31, 32 and 33, a predetermined maximum current from the cathode 21c, corresponding to a minimum value of the condenser 12, will cause the current in the coil 27 to be zero and the current in the coil 26 to be a maximum so as to produce a reading at one extremity of the scale 29a. Likewise, a predetermined minimum current from the cathode 22c, corresponding to the maximum value of the condenser 12, will cause the current in the coil 27 to be a maximum and the current in the coil 26 to be a minimum to cause the pointer 29 to read at the other extremity of the scale. That the currents in the coils will so vary as the potential of the cathode 21c is varied while that of the cathode 22c is fixed is evident from the fact that the potential of the junction 34 between the coils varies always in the same direction as that of the cathode 21c but to a lesser degree, causing therefore the potential of the cathode 21c to gradually approach that of the junction 34 as the potential of the cathode falls and causing the potential of the junction 34 to gradually approach that of the cathode 22c as the potential of the cathode 21c rises.

It is apparent from an inspection of the graph of Figure 2 that it is desirable to adjust the load resistance and the magnitude of the voltage applied to the grids of the cathode-follower stages so that the half-cycle excursions up the load line will be nearly to the plate-current plate-voltage curve for zero grid bias, for then the operation is principally in the region where the tube characteristics are essentially linear and the ratio of the average plate current of the cathode-follower stages, for a given value of the condenser 12, is essentially constant within a wide range of variation of voltage of the source 13. In this respect it is interesting to note that a reduction in the peak voltage applied to the grids should be accompanied by a reduction in the load resistance, for then the cathode does not follow the grid so closely and the operation will extend into the linear portion of the tube characteristics. Of course, to minimize the effect of the curved portion of the tube characteristics, there should be used tubes having sharp plate current cutoff.

The minimum required plate voltage for the cathode-follower stages, for any given value of A.-C. voltage applied their grids, is that which just prevents the grid bias from being overcome. Obviously, as the A.-C. grid voltage is decreased, the plate voltage may be decreased. For example, it is found that upon applying about 25 v. peak to the grid of a 6J5 tube having a cathode load of 4000 ohms, the minimum required plate voltage is approximately 70 v., but if about 42 v. peak are applied to the grid the minimum required plate voltage is approximately 120 v. as hereinbefore mentioned. If the operation is well into the linear portion of the tube characteristics, variations in the plate voltage above the minimum required value have substantially no influence on the indications of the meter 25.

Because of the balancing-out character of the voltage-divider circuits, the frequency and magnitude of the source 13 as well as temperature-induced variations of the elements in these circuits do not tend to produce any error. Also, the final indications are substantially independent of variations in the tube characteristics and the plate supply voltage because of the inherent stability of the cathode-follower circuit. A feature of the system shown in Figure 1 which is instrumental particularly in ruling out varying tube characteristics as a source of error is in biasing the tubes to plate current cutoff, for there is no static space-discharge current to influence the final indications. The only space-discharge currents which flow through the tubes are the alternate half-cycle impulses induced by the voltages under comparison. These space currents depend only on the relatively stable dynamic characteristics of the tubes.

Although the present system is basically independent of the frequency of the source 13, it is found that the driving torque produced in the meter 25 decreases as the frequency of the source 13 increases. It is believed this is due to the fact that the inductance of the meter coils increases with frequency. This objectionable result is however readily overcome simply by placing condensers 40 across the meter coils. These condensers produce the result of maintaining a substantially steady voltage across the coils and of providing a steady and substantially greater flow of current through the coils, all other conditions being the same. The values of these condensers are not critical since they may be selected within a wide range.

By way of example, the following components and typical values have been used very satisfactorily in the system shown in Figure 1: A.-C. voltage of source 13, 50 v. R. M. S. maximum; capacity variation of condensers 12 and 18 in parallel, 600 to 1000 mmfd.; capacity of condensers 11, 15 and 16, 800 mmfd. each; resistances of grid leaks 36 and 37, .4 megohm; space-discharge devices 21 and 22, 1 6SN7 tube; resistances of coils 26 and 27, 1000 ohms each; resistor 31, 8500 ohms; resistor 32, 6500 ohms; resistor 33, 7800 ohms; resistor 38, 10,000 ohms; resistor 39, approximately 800 ohms; battery 24, 120 v. minimum; and condensers 40, .2 mfd. each. With the above values, there is obtained a maximum current through each meter coil of approximately 1.4 ma.

If the operation of the cathode-follower stages is confined principally to the curved portion of the plate-current plate-voltage characteristics, the indications of the meter 25 will vary somewhat with changes in the A.-C. voltage of the source 13 and also with changes in the plate voltage. However, the variation in the indications caused by a change in the voltage 13 is opposite to the variation caused by a change in the plate voltage; in fact, it is found that if these two voltages are maintained in fixed proportion to each other they may be varied through wide ranges without substantially influencing the meter indications at all. Typically the voltage 13 is obtained from an oscillator which is powered from the same source as that which provides the plate voltage, and the oscillator voltage will then tend to vary in fixed relationship with the plate voltage. However, some change in this relationship may occur in practice from variations in the characteristics of the oscillator tubes, change of oscillator tubes, temperature-variable effects, etc. If it is desired to hold this relationship fixed, a rectifier may be connected across the oscillator source 13 and be biased in fixed relation to the plate voltage so as to clip off the peaks of the positive half cycles of the oscillator voltage. As shown dottedly in Figure 1, such clipping may be effected by a diode 47 connected from the ungrounded side of the oscillator source 13 through a suitable on-off switch 48 to a tap 49 of the bleeder circuit 38—39. The switch 48 may be provided to enable the clipping circuit to be disabled if desired. It is preferable to so design the system that the operation will be principally within the linear portion of the tube characteristics, as above described, in which case this clipping circuit is not ordinarily necessary. The maximum voltage of the positive half-cycles of the oscillator source 13 which this clipping circuit will pass is determined by the bias voltage on the diode 47 obtained from the bleeder circuit, provided of course the resistance of the portion of the bleeder circuit from which this bias voltage is obtained is low relative to the effective internal resistance of the source 13. Typically, the diode is biased to clip the normal voltage supply of the oscillator by an amount equal at least to the maximum variation effected in the oscillator voltage independently of the variation thereof induced by changes in the voltage of the power supply for the oscillator.

In Figure 3 there is shown a modified input circuit for the present measuring systems wherein the fixed voltage circuit, corresponding to the fixed voltage-divider circuit 14 of Figure 1, is simply a direct connection of the lead 20 to the driving source 13. This simplified circuit may be employed when it is permissible to impress the whole voltage of the source 13 on the grid 22a of the electron discharge device 22. As before, the ratio of the voltages impressed on the two grids 21a and 22a is independent of the frequency and magnitude of the source 13.

In Figure 4 there is shown another modified form of input circuit for the present measuring system. In this embodiment the voltage taken from the variable divider circuit 10 is fed to the grid 21a through a "link" circuit 41 which is inductively coupled to the condenser 12 by a transformer 42 and to the grid 21a by a transformer 43. The advantage of using such link circuit is that upon the transformer 42 having a stepdown ratio and the transformer 43 having a corresponding step-up ratio the link circuit will have a low impedance and low stray capacitance. Thus, notwithstanding that the condenser 12 may have a high reactance under the particular operating conditions, it may be coupled through long distances to the grid 21a without encountering any substantial loss due to stray capacity of the coupling circuit or without requiring any special low-capacity shielding of that circuit.

Also in Figure 4, the fixed voltage-divider circuit, referred to as 14a, is shown as serially comprising two resistances 44 and 45 in place of the condensers 15 and 16 to illustrate the flexibility in type of impedance elements which may be employed. Since both elements in the fixed divider circuit 14a are of the same type, it is apparent that the ratio of the voltages fed to the grids 21a and 22a is still independent of the frequency and magnitude of the voltage source 13.

In Figure 5 there is shown a different type of cathode-follower circuit for the present measuring system. This cathode-follower circuit may be used with any of the input circuits hereinbefore described, wherefore those circuits need not be here again shown. In this cathode-follower circuit the grid leak resistors 36 and 37 are connected from the grids directly to the respective cathodes, and blocking condensers 46 are connected in the grid circuits where necessary; also, the junction 35 of the bridge 30 is connected directly to ground. As a result, the grids have normally zero bias, and there flows normally a high value of static space-discharge current through the tubes, the quiescent point of operation being at P on the load line in Figure 2. When an A.-C. voltage is impressed on the grids, the grids go positive relative to the cathode and draw current during the positive half cycles. However, as the grids tend to go positive their impedance from ground falls and they capture less voltage from the input circuits; as a result, during the positive half cycles the grid voltages remain substantially fixed. During the negative half cycles of the impressed A.-C. voltage, there are excursions down the load line from the point P, causing the average value of the static space-discharge current to be reduced. Thus, the average values of the space-discharge currents of the two devices 21 and 22 will vary according to the value of the alternating-current voltages impressed on the respective grids. In the cathode circuits of these devices there is the bridge 30 including the coils 26 and 27 as shown in Figure 1. The variation in the effective cathode currents just mentioned will cause the currents in the coils 26 and 27 to vary so as to deflect the pointer 29 across the scale 29a according to the ratio of the impressed A.-C. voltages as hereinbefore described. In this case, however, the readings are dependent on the static discharge currents of the cathode-follower tubes. This is beneficial in securing a better driving torque in the instrument 25 but may be detrimental where a high degree of accuracy is required since this static discharge current, being dependent on the tube characteristics, may introduce a source of error.

In Figure 6 there is shown a modified system of the character above described wherein the cathode-follower stages are biased to pass A.-C. voltages without clipping or rectifying those voltages, and separate devices are employed for effecting the rectification if desired. The input circuit may be any of those hereinbefore described, it being shown for example as comprising the variable voltage-divider circuit 10 and the fixed divider circuit 14a connected across the common source 13. The voltages from these circuits are fed to the grids of the two space-discharge devices 21 and 22. Serially connected between the cathodes and ground of these devices are respective load resistors 50 and 51 and bias resistors 52 and 53, with the latter being connected nearer to the cathodes. Shunting these bias resistors are condensers 54, and connected from the respective grids to the lower-potential sides of these bias resistors are the grid-leak resistors 36 and 37. Thus the grids are biased to a voltage intermediate a zero bias and that which produces plate current cutoff. As so biased, the cathode-follower stages will pass A.-C. voltages without rectification or clipping.

Connected across each load resistor 50 and 51 is a blocking condenser 55 and resistor 56 in series, and connected across each resistor 56 is a rectifier 57 feeding into the bridge 30 shown in Figure 1. Of course instead of using half-wave rectifiers as shown, there may be used full-wave rectifiers, in which case the blocking condensers 55 and resistors 56 are not required.

In this system of Figure 6, the operation of the cathode-follower stages may be confined wholly to the linear portion of the tube characteristics. As a result, the operation of the cathode-follower stages is substantially independent of variations in the voltage of the source 13 above any mean value not exceeding a maximum limit, and is independent also of variations of the plate supply voltage above the required minimum limit. However, this circuit requires a higher plate voltage to produce a given driving torque in the instrument 25 than do the rectifying cathode-follower circuits hereinbefore described.

The present invention comprehends, as a substantial equivalent, the use in Figure 6 of a conventional amplifying stage having a plate-to-grid feedback in place of the cathode-follower stages as above shown. Such modified embodiment is indicated in Figure 6a. Here the two grids are returned to ground through the grid leak resistors 36 and 37 and the cathodes are returned to ground through bias resistors 57 and 58 shunted by respective condensers 59. The plates are connected through load resistors 60 and 61 to a battery 62, and across these load resistors are connected the blocking condensers 55, resistors 56, rectifiers 57 etc., as shown in Figure 6. A feedback circuit serially including a blocking condenser 63 and a resistance 64 is connected from each plate to the respective grid. By properly selecting the values of the resistors 64 in the feedback circuits, the effective propagation factors of each amplifier stage can be made very low, in which case the stability of the stage will be enhanced as with respect to variations in plate voltage and tube characteristics to approximate the stability and dependability of the cathode-follower stage. Also, such conventional amplifying stage with degenerative feedback, like the cathode follower stage, has very low dynamic plate resistance to enable efficient power transfer from the amplifier stage to the output meter.

It will be understood that in either of the systems shown in Figures 6 and 6a, each rectifier 57 and respective resistor 56 may be eliminated so as to feed A.-C. voltage to the bridge 30, and that in such case the D.-C. type of instrument 25 may be replaced by a suitable A.-C. type of instrument.

In Figure 7 there is shown a modified form of the system of Figure 6 employing a single amplifying stage with feedback, preferably of the cathode-follower type, as shown. The upper half portion (above the ground line 17) of this system is the same as the corresponding portion of the system of Figure 6 and has the same reference characters. However, in the lower half portion, there are eliminated the thermionic cathode-follower stage 22 and its associated elements 37, 51 53, 54, 55 and 56, and the lead 20 from the fixed divider circuit 14a is connected directly to the rectifier 57. This elimination of the second cathode-follower stage is generally permissible, because the thermionic tube 21, when connected in cathode-follower arrangement, has the ability to transmit the voltages applied to it without any substantial variation caused by normal changes in the plate voltage supply and in the tube characteristics. In this case the resistances of the fixed divider circuit have preferably relatively low values such as will enable the source 13 to provide voltage impulses in the bridge 30 of the desired value relative to those provided by way of the cathode-follower stage. It will be observed that the cathode-follower stage 21 is however a necessary component of the present system since it is called upon to effect a power amplification and a high ratio of impedance transformation between the high-impedance voltage-divider circuit 10 and the relatively low-impedance measuring or control circuit 30.

As a further illustration of my invention there is shown in Figure 7a a modified form of the system of Figure 5 wherein there is employed a single cathode-follower stage. Here again substantially the upper half portion of this modified system is the same as the corresponding portion of the system of Figure 5. The thermionic tube 22, which receives the voltage of the fixed divider circuit 14 is however here eliminated. Instead, the source 13 is stepped up in voltage by a transformer 71, rectified by a rectifier 72, filtered by a filter generally referred to as 73 and fed to a bleeder circuit 74 and, by a lead 75, to the plate 21b of the thermionic tube 21. From the bleeder circuit there is tapped off a voltage of suitable value which is fed by a lead 76 to a point of the bridge 30 corresponding to that which, in Figure 5, is connected to the cathode of the second thermionic tube 22. It will be observed that so long as the operation of the thermionic stage 21 is substantially independent of its plate supply voltage, the ratio of the two rectified voltages which are fed to the bridge circuit 30 is dependent only on the variable condenser 12, the same as in the system of Figure 5. For the same reasons as are pointed out above in connection with the system of Figure 7, the cathode-follower stage 21 remains a necessary component of the system.

This invention comprehends that in any of the foregoing indicating systems the instrument 25 may be converted to a control instrument, or relay, by providing the movable pointer with a contact 65 and providing in the path of this movable contact one or more semistationary contacts 66 as indicated in Figure 8. The foregoing systems may thus be converted to control suitable apparatus for fueling or defueling tanks in case the systems are operated from a tank condenser 12 as above described, or may of course otherwise be used in a wide range of control applications.

In Figure 9, there is shown purely by way of example a type of input circuit for the present system which may well adapt the system for the measuring of frequency. This input circuit comprises one voltage-divider circuit that serially includes two impedance elements 67 of the same type—for example resistors—so as to be independent of frequency; also, the input circuit comprises a second voltage-divider circuit that is sensitive to frequency, including for example a resistance 68 and condenser 69 in series. Both of these voltage-divider circuits are, as before, connected across a common source of A.-C. voltage 70 the frequency of which is under measurement. As the frequency of this source varies, for example, the ratio of the voltages taken from the two divider circuits by the leads 19 and 20 will vary and may be indicated by the systems hereinabove described, it being understood however that this ratio is independent of the magnitude of the source 70.

Figure 10:
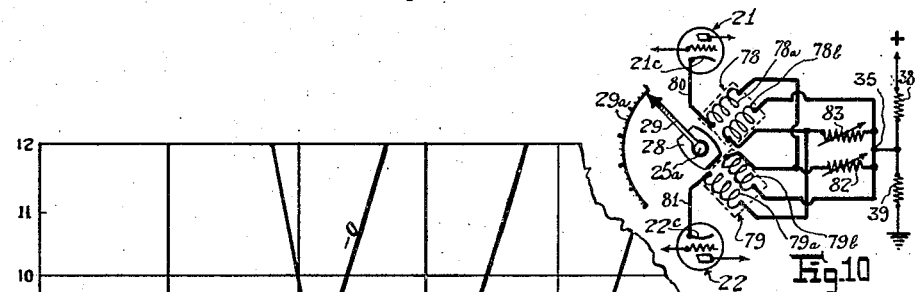
Figure 10 is a fractional view showing an alternative form of indicating and/or control instrument for the present electrical systems.

The present electrical systems are not limited to the particular instrument 25 and bridge circuit 30 above described but may employ any suitable instrument for producing a deflection in response or according to the variation in the ratio of the voltages under comparison. In Figure 10, for example, I show an alternative such instrument and circuit. This instrument, referred to generally as 77, has a rotor 28 and pointer 29 pivoted at 25a, the same as the instrument 25. However, in this instrument each of the field coils is provided in two sections, there being one coil 78 having sections 78a and 78b and a coil 79 having sections 79a and 79b. The coil sections 78a and 79b are serially included in a circuit 80 connected from the cathode 21c to the junction 35, and the coil sections 79a and 78b are serially included in a circuit 81 connected from the cathode 22c to the junction 35, this junction being connected for example to the bleeder circuit 38—39 as in Figure 1. The sections of each coil 78 and 79 are poled in the circuits 80 and 81 so as to magnetically oppose each other; also the sections of each coil are placed in close physical relationship with one another so that when the ampere turns in the sections are equal the resultant field is effectively neutralized. A preferred form of each coil 78 and 79 is one of a "twin-filament" type wherein two wires are wound side by side to form coil sections having equal turns and resistance.

From the foregoing description it is understood that the potential of the cathode 21c is varied in response to variation of the quantity under measurement and that the potential of the cathode 22c is relatively fixed. If the potential of the cathode 21c is varied say 20% above and below that of the coil 22c, the coil sections with the suffix letter b should likewise have effectively 20% less ampere turns than the respective coil sections with the suffix letter a for equal currents in the circuits 80 and 81. This is accomplished by placing adjustable resistors 82 and 83 across the coil sections 78b and 79b. The resistor 82 is adjusted so that when the voltage of the cathode 21c is a maximum the resultant field of the coil 79 is substantially zero and so that when the voltage of the cathode 21c is a minimum the resultant field of the coil 78 is substantially zero. Under these conditions it is apparent that when the effective field of one coil is substantially zero that of the other coil is a maximum. Thus, as the voltage of the cathode 21c varies between maximum and minimum values, the rotor 28 will be deflected, as in the instrument 25, to swing the pointer 29 across the full length of the scale 29a. When both the coils and the resistors 82 and 83 have the same temperature coefficient of electrical conductivity, say that of copper, the currents in the circuits 80 and 81 vary alike with change in temperature and temperature effects are therefore balanced out.

Figure 11:
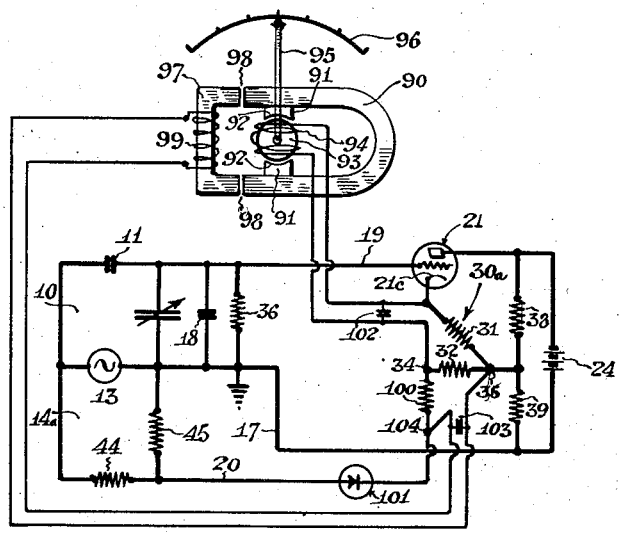
Figure 11 is a view showing the system generally of Figure 1 modified to use an indicating instrument of the compensated moving-coil type.

In Figure 11 the system of Figure 1 is revised to include a D'Arsonval type of electrical instrument having a compensating coil which, when the instrument is connected in an ohmmeter type of circuit, is adapted to compensate for fluctuations in the source of potential used to operate the ohmmeter. A simple form of short-scale instrument of this type is described in the Harrison Patent No. 1,695,424 issued December 18, 1928. This instrument comprises a magnet 90 having field poles 91 with confronting arcuate pole faces 92 between which is centered a soft iron cylindrical core 93. Surrounding this core is a moving coil 94 pivoted at the central axis of the core, and carried with the moving coil is a pointer 95 which registers with a scale 96. As so far described, this is a regular D'Arsonval type of instrument. To compensate such instrument for fluctuations in the voltage supply when the instrument is used in an ohmmeter circuit, the poles of the magnet 90 may be bridged by a soft iron bar 97, which may have air gaps 98 between it and the magnet poles. On this bar there is a compensating coil 99. In typical ohmmeter circuits the moving coil is connected as the cross arm of an electrical bridge and the compensating coil is connected in series with the source of voltage for the bridge. Thus, the current in the moving coil will vary over a wide range as from zero to a maximum in response to variations in the resistance under measurement. The current in the compensating coil, on the other hand, varies only with change in the voltage of the source. Upon poling the compensating coil so that its electromagnetic field opposes that of the permanent magnet, the effective magnetic field across the poles 91 is reduced in response to an increase in the voltage source to compensate for the increase of current in the moving coil in response to that voltage increase, and vice versa. While I do herein illustrate my invention in connection with this simplified short-scale form of compensated moving-coil instrument, it will be understood that my invention is applicable as well to improved long-scale (approximately 270°) moving-coil instruments of this compensated type such as the improved long-scale instrument described in the pending application of Jacob L. Zar, Serial No. 676,613, filed June 14, 1946 and having a common assignee with the present application.

The system shown in Figure 11 has a bridge circuit 30a corresponding to the bridge circuit 30 of Figure 1 but differing from the latter in that the compensating coil 99 of the above described instrument is connected in the place of the resistor 33 and in that a resistor 100 is connected in the place of the field coil 27. Also, in place of the field coil 26 there is connected a moving coil 94.

An additional change in the system of Figure 11 over that of Figure 1 lies in eliminating the second thermionic stage including the tube 22, and in connecting a rectifier 101 in its place as in the embodiments of Figure 7 and 7a hereinbefore described. The rectifier 101 is used in place of the tube 22 because the compensating coil requires considerable electrical power—typically of the order of .5 w.—and a simple rectifier is better able to supply this power than is a thermionic amplifier stage. Since this power for the compensating coil is to be obtained from the oscillator source 13, the resistors 44 and 45 of the fixed voltage-divider circuit 14a will typically have low values or may desirably be eliminated as shown in Figure 3 whenever the full voltage of the source 13 may be applied to the rectifier 101. To increase the flow of current through the coils 94 and 99 as is hereinbefore described, the same are shunted by respective condensers 102 and 103.

Since the potential at the junction 104 of the bridge 30a does not vary with change in the detecting condenser 12 but does change with the voltage of the source 13, and the potential of the other corresponding junction of the bridge 30a, the cathode 21c, varies both with change in the condenser 12 and the voltage of the source 13, the currents in the two coils 94 and 99 vary alike in response to changes in the voltage of the source 13 but the current in the moving coil varies only with change in the condenser 12. Since the oscillator source 13 produces like current changes in both coils, variations in the voltage of this source are ruled out as a source of error. It may be noted that changes in the voltage of the battery 24 will tend to produce a relative variation in the currents in the two coils 94 and 99 but that such relative change will be very small and will produce little error since variations in the battery produce no substantial variations in the current of the moving coil in view of the operation of the cathode-follower stage 21 being substantially independent of plate voltage.

Figure 12:
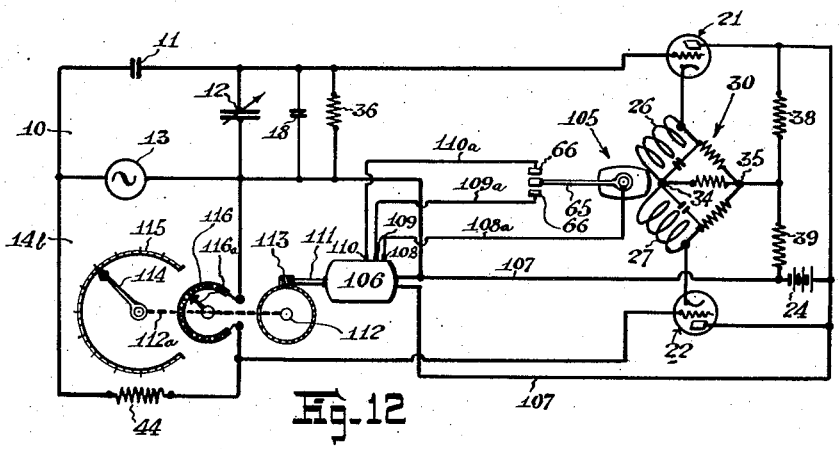
Figure 12 is a view generally of the system of Figure 1 modified to work as a null-type indicator.

In Figure 12 there is shown a revision of the system of Figure 1 to convert it to one of a null type having a long scale as of the order of 300° to 360°. In this system the electrical instrument 105 is a double-throw relay having a pole 65 working between two contacts 66 as before shown in Figure 8. The circuit for this relay may comprise the bridge 30, but alternatively the resistors 31, 32 and 33 may be eliminated and the junction 34 may be joined directly to the junction 35 as whenever less sensitivity—less deflection per unit change of the condenser 12—is needed. The relay 105 controls a reversible motor 106 which is supplied with power from the battery 24 through leads 107. This motor is of a type having a pole terminal 108 and two associated control terminals 109 and 110. These terminals are connected to the motor circuit so that when the two 108 and 109 are bridged together the motor will turn in one direction and when the two 108 and 110 are bridged together the motor will turn in a reverse direction, the motor coming to standstill when these terminals are open. The pole terminal 108 is connected by a lead 108a to the pole 65 of the relay 105 and the control terminals 109 and 110 are connected by respective leads 109a and 110a to the respective contacts 66. Thus, when the relay closes in one direction the motor will turn one way and when the relay closes in the other direction the motor will turn the other way, the motor coming to standstill when the relay contacts open.

The motor has a shaft 111 which drives a shaft 112 at right angles thereto through worm gearing 113. The shaft 112 has a drive connection, generally referred to as 112a, to a pointer 114 which registers with a scale 115. This scale may have any desired length up to a maximum of 360°. Also, as through the drive connection 112a, the motor drives a movable arm 116a of a rheostat 116. This rheostat replaces the resistor 45 of the fixed voltage-divider circuit, this circuit being here referred to as 14b. This system is arranged so that when the voltage on the condenser 12 and that across the rheostat 116 are in a predetermined ratio, say a ratio of unity, the relay 105 is open with the pole 65 thereof being substantially midway between the two contacts 66. The operation of this system is as follows:

When the condenser 12 undergoes a predetermined change in capacity, the pole 65 is closed with one of the contacts 66 to start the motor running to shift the position of the pointer 114 relative to the scale 115 and concurrently to vary the rheostat 116. The relay, motor and drive connections of the motor to the rheostat are poled so that this variation of the rheostat will bring the voltage thereacross substantially in balance with that across the condenser 12. When this condition of substantial balance is reached the relay 105 is again opened and the motor comes to a standstill. A change in the rheostat through its full range is accompanied by a change in the pointer 114 across the full length of the scale 115, and the scale 115 is so calibrated that the pointer will register with a division thereon corresponding to the value of the condenser 12 or the quantity which the condenser represents, as when the voltages across the condenser and the rheostat are substantially in balance. Thus, there is obtained a long-scale measuring system, which is very desirable in aircraft fuel gauges because of the large quantity of fuel which the system must gauge. Also, since each reading is obtained under conditions of substantial balance, as to the voltages taken from the two voltage-divider circuits, errors due to temperature, etc. are substantially balanced out.

I have hereinabove particularly described my invention in terms of certain preferred embodiments, but these embodiments are intended to be illustrative and not necessarily limitative of my invention since the same are subject to changes and modifications without departure from the scope of my invention, which I endeavor to express according to the following claims.

I claim:

1. In an electrical system responsive to a variable quantity and including sources of alternating and direct current: the combination of means for providing a first A.-C. voltage dependent both on said A.-C. source and said variable quantity; means connected to said A.-C. source for providing a second A.-C. voltage dependent on said A.-C. source and independent of said quantity; a pair of thermionic stages each including a cathode, grid and plate, means for feeding said A.-C. voltages to said grids respectively, means connecting said stages as cathode followers with the plates thereof being connected directly to said D.-C. source and with the grids thereof being biased relative to the respective cathode potentials to produce D.-C. voltages in the respective cathode circuits which vary substantially according to said respective A.-C. voltages; a D.-C. type of electrical instrument having a movable element and coils for producing two relatively variable electromagnetic fields to deflect said element upon relative variation of two D.-C. currents; and a bridge-type load circuit between said cathodes and ground comprising a first branch serially including said coils and connected between the cathodes of said stages, a second branch serially including two impedances and connected also between said cathodes, and a third impedance connected between a point in said first branch and a point in said second branch.

2. The combination set forth in claim 1 including means connected between said A.-C. and D.-C. sources for maintaining the voltage of said A.-C. source and said plate potential substantially in fixed proportion to each other.

3. In an electrical system responsive to a variable quantity and including a source of alternating current: the combination of means for providing a first A.-C. voltage dependent both on said source and said variable quantity; means connected to said source for providing a second A.-C. voltage dependent on said source and independent of said quantity; a pair of thermionic stages each including a cathode, grid and plate, means for feeding said A.-C. voltages to said grids respectively, means connecting said stages as cathode followers with the grids thereof being biased relative to the respective cathode potentials to produce D.-C. voltages in the respective cathode circuits which vary substantially according to said respective A.-C. voltages; a D.-C. type electrical instrument including a movable element and coils for deflecting said element upon variation of the D.-C. currents in said coils; a bridge circuit including said coils connected in series between said cathodes, and three resistors connected respectively from said cathodes and a point between said coils to a common junction; and a circuit connection between said junction and ground of the system.

4. The combination set forth in claim 3 including electrical condensers connected across said coils for increasing effectively the current flow through the coils respectively.

5. In an electrical system responsive to a variable quantity and including sources of A.-C. and D.-C. current: the combination of means for providing a first A.-C. voltage proportional both to that of said A.-C. source and to said variable quantity; means for providing a second A.-C. voltage proportional to that of said A.-C. source and independent of said quantity; a pair of thermionic devices each including a cathode, grid and plate; means feeding said A.-C. voltages to said grids respectively; means connecting said plates directly to said D.-C. source; means connected to D.-C. source for biasing said grids substantially in fixed proportion to the respective plate voltages to maintain said devices substantially at plate current cutoff; and a D.-C. type electrical instrument including a movable element and coils for producing two relatively variable electro-magnetic fields to deflect said element upon relative variation of two D.-C. currents, said coils being connected in the cathode circuits of said devices.

6. The combination set forth in claim 5 including a rectifier connected across said A.-C. source and biased in fixed proportion to said D.-C. source for clipping peak portions of the positive half cycles of said A.-C. source whereby to maintain a fixed proportionality between the magnitude of said positive half cycles and the voltage supply to said plates.

7. In an electrical system responsive to a variable quantity and including sources of A.-C. and D.-C. current: the combination of means for providing a first A.-C. voltage proportional both to that of said A.-C. source and to said variable quantity; means for providing a second A.-C. voltage proportional to that of said A.-C. source and independent of said quantity; a pair of thermionic devices each including a cathode, grid and plate; grid-leak resistors connecting said grids to ground for the system; means feeding said A.-C. voltages to said grids respectively; means connecting said plates to said D.-C. source; a bleeder circuit connected from said D.-C. source to ground for the system; a D.-C. type instrument including a movable element and a pair of coils for deflecting said element in response to a relative variation of D.-C. current through said coils; and a bridge circuit including said coils and connected between said cathodes and a tap of said bleeder circuit, said tap being chosen to cause said thermionic devices to be biased substantially to plate current cutoff.

8. In an electrical system responsive to a variable quantity and including a source of alternating current: the combination of means for providing a first A.-C. voltage dependent both on said source and said variable quantity; means connected to said source for providing a second A.-C. voltage dependent on said source and independent of said quantity; a pair of thermionic devices each including a cathode, grid and plate connected as cathode followers, said A.-C. voltages being fed to said grids respectively; grid leak resistors connected between said grids and respective cathodes for biasing said grids substantially to the potential of the respective cathodes so that D.-C. voltage variations are produced in the cathode circuits of said devices according to the respective A.-C. voltages impressed on said grids; a D.-C. type electrical instrument including a movable element and coils for producing two relatively variable electro-magnetic fields to deflect said element upon relative variation of two D.-C. currents; and a circuit including said coils and connected between said cathodes and ground for said system.

9. The combination set forth in claim 8 wherein said last-stated circuit is of a bridge type having a branch connected between said cathodes and serially including said coils, and including three resistors connected respectively from said cathodes and from the junction between said coils to said ground.

10. A rectifying system comprising a thermionic device having a cathode, grid and plate connected as a cathode follower; a load device connected between said cathode and ground of said system; means for supplying a potential to said plate; and means connected to said plate-supplying means for biasing said grid in accordance with said plate potential substantially to plate current cutoff.

11. A rectifying system comprising a thermionic device having a cathode, grid and plate connected as a cathode follower; means for supplying a D.-C. potential to said plate; a grid-leak resistor connected between said grid and ground for said system; a bleeder circuit connected across said plate-supplying means and to said ground; and a load circuit for said device connected between said cathode and a point of said bleeder circuit to bias said grid substantially to plate current cutoff.

12. In an electrical system responsive to a variable quantity and including sources of direct and alternating current: the combination of one circuit composed only of linear impedance elements one of which is variable and connected to said A.-C. source for providing a first A.-C. voltage proportional both to that of said A.-C. source and to said quantity; a second circuit connected to said A.-C. source for providing a second A.-C. voltage proportional to that of said A.-C. source and substantially independent of said quantity; a cathode-follower stage including a grid, cathode and plate connected to operate as a rectifier said plate being connected to said D.-C. source; means feeding said first A.-C. voltage to said grid; a D.-C. type electrical instrument including a movable element and two coils for deflecting said element upon a relative variation of D.-C. current in said coils; circuit means connected to said second circuit and including a rectifier for providing a D.-C. voltage proportional to said second A.-C. voltage; a circuit for feeding the rectified voltages from said cathode-follower stage and said rectifier to said coils, said circuit having a ground connection and being adapted to cause a relative change in the D.-C. current in said coils in response to a variation of said variable quantity; and means connected between said A.-C. and D.-C. sources for maintaining the effective voltages of said sources substantially in fixed proportion to each other.

13. In an electrical ratio system for measuring a variable electrical quantity, including A.-C. and D.-C. sources of potential: the combination of a first voltage-divider circuit connected across said A.-C. source and having an output terminal for providing a first A.-C. voltage, relative to ground of said system, which is proportional both to that of said source and to said variable quantity; a second voltage-divider circuit connected to said A.-C. source and having an output terminal for providing a second A.-C. voltage proportional to that of said source and substantially independent of said variable quantity; a pair of thermionic stages each including a cathode, grid and plate operated as a cathode follower; means connecting the plates of said stages directly to said D.-C. source of potential; means connecting said grids respectively to the output terminals of said divider circuits; means biasing said grids relative to the respective cathodes to cause D.-C. voltages to be produced in the respective cathode circuits which vary substantially according to the A.-C. voltages applied to the respective grids whereby said cathode-follower stages operate as rectifiers; a D.-C. ratio instrument comprising a movable indicating element and two associated coils for deflecting said element according to the ratio of the currents in said coils; and a load circuit comprising said coils and connected between the cathodes of said stages and ground, said load circuit being adapted to produce relatively varying currents in said coils according to variations in the relative potentials of the cathodes of said stages.

14. In an electrical system responsive to a variable quantity and including a source of alternating current: the combination of means for providing a first A.-C. voltage dependent both on said source and said variable quantity; means connected to said source for providing a second A.-C. voltage dependent on the source and independent of said quantity; a pair of thermionic devices each including a cathode, grid and plate operated as a cathode follower; grid leak resistors connected between said grids and ground of said system; means feeding said A.-C. voltages to said grids respectively; a D.-C. ratio-type instrument including a movable element and two coils for deflecting said element in response to a variation in the ratio of the currents in said coils; circuits connecting said coils between said cathodes and a junction point in said system; and means between said junction and ground for supplying a D.-C. potential to said cathodes to bias said grids substantially to plate-current cut-off so that pulsating D.-C. currents are produced in the cathode circuits substantially in proportion to the respective A.-C. voltages applied to said grids.

GEORGE H. FRITZINGER.

REFERENCES CITED

The following references are of record in the file of this patent:

UNITED STATES PATENTS

| Number | Name | Date |
| --- | --- | --- |
| 1,334,118 | Rice | Mar. 16, 1920 |
| 1,684,397 | Hubbard | Sept. 18, 1928 |
| 2,188,628 | Freystedt | Jan. 30, 1940 |
| 2,213,099 | Adorjan | Aug. 27, 1940 |
| 2,241,915 | Kramar | May 13, 1941 |
| 2,363,690 | Razek | Nov. 28, 1944 |
| 2,394,079 | Langer et al. | Feb. 5, 1946 |
| 2,400,909 | Birss | May 28, 1946 |
| 2,432,826 | Smith | Dec. 16, 1947 |